US009814355B2

United States Patent
Winter et al.

(10) Patent No.: US 9,814,355 B2
(45) Date of Patent: Nov. 14, 2017

(54) PRESSURE ASSIST FEATURE FOR PRESSURE FRYER

(71) Applicant: Henny Penny Corporation, Eaton, OH (US)

(72) Inventors: David B. Winter, Eaton, OH (US); Gary L. Mercer, Eaton, OH (US); Tim A. Landwehr, Eaton, OH (US); Keith Lambert, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 527 days.

(21) Appl. No.: 14/077,930

(22) Filed: Nov. 12, 2013

(65) Prior Publication Data

US 2015/0129509 A1   May 14, 2015

(51) Int. Cl.
*A47J 27/092*   (2006.01)
*A47J 37/12*   (2006.01)
(Continued)

(52) U.S. Cl.
CPC ............ *A47J 37/1223* (2013.01); *A23L 5/11* (2016.08); *A23L 5/17* (2016.08); *A47J 27/0802* (2013.01);
(Continued)

(58) Field of Classification Search
CPC ......................... A23L 5/11; A23L 5/17; A23L 1/0107–1/0114; A23L 1/0135; A47J 27/08–27/092; A47J 37/12–37/1295
(Continued)

(56) References Cited

U.S. PATENT DOCUMENTS 3,167,435 A   1/1965 Hall
3,187,664 A * 6/1965 Jennings ............. A47J 27/0802
                                                 126/374.1
(Continued)

FOREIGN PATENT DOCUMENTS

CA        771120 A    11/1967
JP        H0690679 A   4/1994
KR     20110026878 A   3/2011

OTHER PUBLICATIONS

International Search Report and Written Opinion cited in International Appl. No. PCT/US2014/064504 dated Feb. 12, 2015.
(Continued)

*Primary Examiner* — Drew Becker
(74) *Attorney, Agent, or Firm* — Wood Herron & Evans LLP

(57) ABSTRACT

Methods and systems disclosed herein may be methods for rapidly increasing pressure in a pressure fryer cooking vessel during a cooking cycle. Such methods and systems may comprise determining whether a pressure output in the cooking vessel is closed. Such methods and system may also include determining a pressure of the cooking vessel, comparing the pressure of the cooking vessel to a predetermined optimal pressure to determine whether the pressure of the cooking vessel is less than the optimal pressure, and activating a filter pump configured to supply air from a drain pan into the cooking vessel in response to determining that the pressure output is closed and the pressure of the cooking vessel is less than the optimal pressure. Such methods and systems may further include deactivating the filter pump when the pressure within the cooking vessel is equal to or greater than the optimal pressure.

9 Claims, 3 Drawing Sheets

(51) Int. Cl.
*A23L 5/10* (2016.01)
*A47J 27/08* (2006.01)

(52) U.S. Cl.
CPC ......... *A47J 27/0817* (2013.01); *A47J 27/092* (2013.01); *A47J 37/1266* (2013.01); *A47J 37/1285* (2013.01)

(58) Field of Classification Search
USPC ........... 426/523, 438–441, 231–233; 99/325, 99/330, 337, 338, 403–418, 468, 473
See application file for complete search history.

(56) References Cited

U.S. PATENT DOCUMENTS

| | | | | |
|---|---|---|---|---|
| 3,194,662 A * | 7/1965 | Nelson | .................. | A23L 1/0107 219/431 |
| 3,245,800 A * | 4/1966 | Sanders | ................ | A23L 1/0107 426/296 |
| 3,431,834 A * | 3/1969 | Mainers | .............. | A47J 27/0817 99/330 |
| 3,608,472 A * | 9/1971 | Pelster | ................ | A47J 27/0817 200/81.9 M |
| 3,610,133 A * | 10/1971 | Mies, Jr. et al. | .... | A47J 27/0817 137/624.12 |
| 3,649,290 A * | 3/1972 | Angold | ............... | A47J 27/0817 426/296 |
| 3,816,703 A * | 6/1974 | Binks | .................... | A22C 21/00 126/389.1 |
| 3,821,925 A * | 7/1974 | Moore | ................ | A47J 37/1219 99/327 |
| 3,973,481 A * | 8/1976 | Mies | ................... | A47J 27/0817 426/438 |
| 4,636,949 A | 1/1987 | Longabaugh | | |
| 4,686,896 A | 8/1987 | Gordon | | |
| 4,785,725 A * | 11/1988 | Tate | .................... | A47J 37/1228 169/23 |
| 4,911,068 A * | 3/1990 | Koether | .............. | A47J 27/0817 426/438 |
| 5,243,898 A | 9/1993 | Sakuma | | |
| 5,617,777 A * | 4/1997 | Davis | .................. | A47J 37/1223 210/167.28 |
| 5,721,001 A | 2/1998 | Ishikura et al. | | |
| 5,942,269 A * | 8/1999 | Casey | .................. | A47J 37/1266 210/DIG. 8 |
| 5,973,297 A * | 10/1999 | Winter | ................ | A47J 37/1223 219/439 |
| 6,022,572 A * | 2/2000 | Winter | .................... | A47J 27/62 426/231 |
| 6,242,025 B1 * | 6/2001 | Lesky | ..................... | A23L 1/318 426/231 |
| 6,505,546 B1 * | 1/2003 | Koether | .............. | A47J 27/0817 99/336 |
| 6,810,791 B2 * | 11/2004 | Kijimoto | ............. | A47J 27/0817 126/374.1 |
| 2004/0144258 A1 * | 7/2004 | Kobayashi | .......... | A47J 27/0817 99/331 |
| 2004/0163547 A1 | 8/2004 | Kijimoto | | |
| 2004/0177767 A1 | 9/2004 | Kijimoto | | |
| 2008/0121115 A1 * | 5/2008 | Tiszai | ................. | A47J 37/1266 99/334 |
| 2008/0229934 A1 * | 9/2008 | Theodos | ............. | A47J 37/1266 99/330 |
| 2009/0084273 A1 * | 4/2009 | Lackman | ............. | A47J 37/1266 99/408 |
| 2010/0116345 A1 * | 5/2010 | Florkey | ................ | A47J 37/1223 137/1 |
| 2012/0199571 A1 * | 8/2012 | Brown | ...................... | A23L 5/17 219/401 |
| 2013/0098847 A1 * | 4/2013 | Lambert | ............. | A47J 37/1223 210/744 |
| 2013/0249698 A1 * | 9/2013 | Fissler | ................ | A47J 27/0802 340/626 |
| 2014/0076904 A1 * | 3/2014 | Wood | .................. | A47J 27/0804 220/573.1 |

OTHER PUBLICATIONS

European Patent Office, European Search Report cited in EP Appl. No. 14862245.9-1656 dated Sep. 5, 2017 (9 pages).

* cited by examiner

PRESSURE ASSIST FEATURE FOR PRESSURE FRYER

BACKGROUND OF THE INVENTION

1. Field of the Invention

The invention relates generally to a pressure assist feature for cooking medium systems (e.g., pressure fryers) that use cooking media to cook food product under pressure. Specifically, the invention relates to using a filter pump for quickly increasing the pressure in the cooking chamber to facilitate pressurized cooking.

2. Description of Related Art

Known cooking apparatus, such as pressure fryers, are used to cook various food products, e.g., poultry, fish, potato products, and the like. Such cooking apparatus may include one or more cooking chambers, e.g., fryer pots, which may be filled with a cooking medium, e.g., an oil, a liquid shortening, or a meltable-solid shortening. Such cooking apparatus also may include a heating element, e.g., an electrical heating element, or a gas heating element, such as a gas burner and gas conveying tubes, which heat the cooking medium in the cooking chamber. The amount of time sufficient to cook or to complete the cooking of the food product at a given cooking temperature depends on the type and the amount of food product that is cooked. In a pressure fryer, when the food product is submerged in the oil, the food product cooks, releasing heat and steam, which pressurizes the cooking chamber. The increased pressure in the cooking chamber allows for thorough cooking in reduced time, and assists in preventing drying out of the food product.

Known pressure fryers may include a valve that, when not energized, may be open to allow pressure within a cooking chamber to vent. Then, when the valve is energized, the valve may close and pressure may be allowed to build up in the cooking chamber, e.g., during a cooking cycle. When cooking most food products in a pressure fryer, moisture within the food product boils out of the food product and turns into steam, which creates pressure in the enclosed cooking chamber. As the pressure inside the cooking chamber increases during cooking, a dead-weight mechanism regulates the pressure to an optimal operating pressure, e.g., about 11-12 pounds per square inch ("PSI"). However, how quickly the pressure in the cooking chamber may reach the operating target pressure is highly dependent on how much moisture is in the food product and how much food product is loaded into the pressure fryer.

Typically, larger loads of food product, which may contain more moisture and more surface area, may result in a cooking cycle that reaches operating target pressure faster than a smaller load of food product. For example, cooking a full, 8-head load of chicken may result in a cooking cycle that reaches operating target pressure after about four (4) to five (5) minutes, while cooking a 2-head load of chicken may take substantially longer to reach operating target pressure. A typical cooking cycle may be between twelve (12) to twenty (20) minutes total. Thus, while pressure fryers may produce optimal results for larger loads, a smaller load of food product, for example, may take nearly the entire cooking cycle time to reach operating pressure, resulting in inefficiency and loss of many of the benefits of pressure-frying.

SUMMARY OF THE INVENTION

Therefore, a need has arisen for methods of a pressure assist feature that may produce more rapid pressurization of the cooking chamber, particularly when cooking smaller loads of food, so that the duration of cooking under pressure is optimized. Moreover, this pressure assist feature may be fine-tuned to pressurize the cooking chamber to different levels, depending on the amount of food product being cooked.

Methods disclosed herein may be methods for rapidly increasing pressure in a pressure fryer cooking vessel during a cooking cycle. Such methods and systems may comprise determining whether a pressure output in the cooking vessel is closed, the pressure output configured to vent at least one of air and steam out of the cooking vessel. Such methods and system may also include determining a pressure of the cooking vessel, comparing the pressure of the cooking vessel to a predetermined optimal pressure to determine whether the pressure of the cooking vessel is less than the optimal pressure, and activating a filter pump configured to supply air from a drain pan into the cooking vessel in response to determining that the pressure output is closed and the pressure of the cooking vessel is less than the optimal pressure. Such methods and systems may further include deactivating the filter pump when the pressure within the cooking vessel is equal to or greater than the optimal pressure. Computer-readable instructions to perform such methods may be stored on non-transitory, computer-readable medium. Further, a fryer apparatus comprising a controller comprising one or more processors and a memory may be configured to implement such methods.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Figure 1:
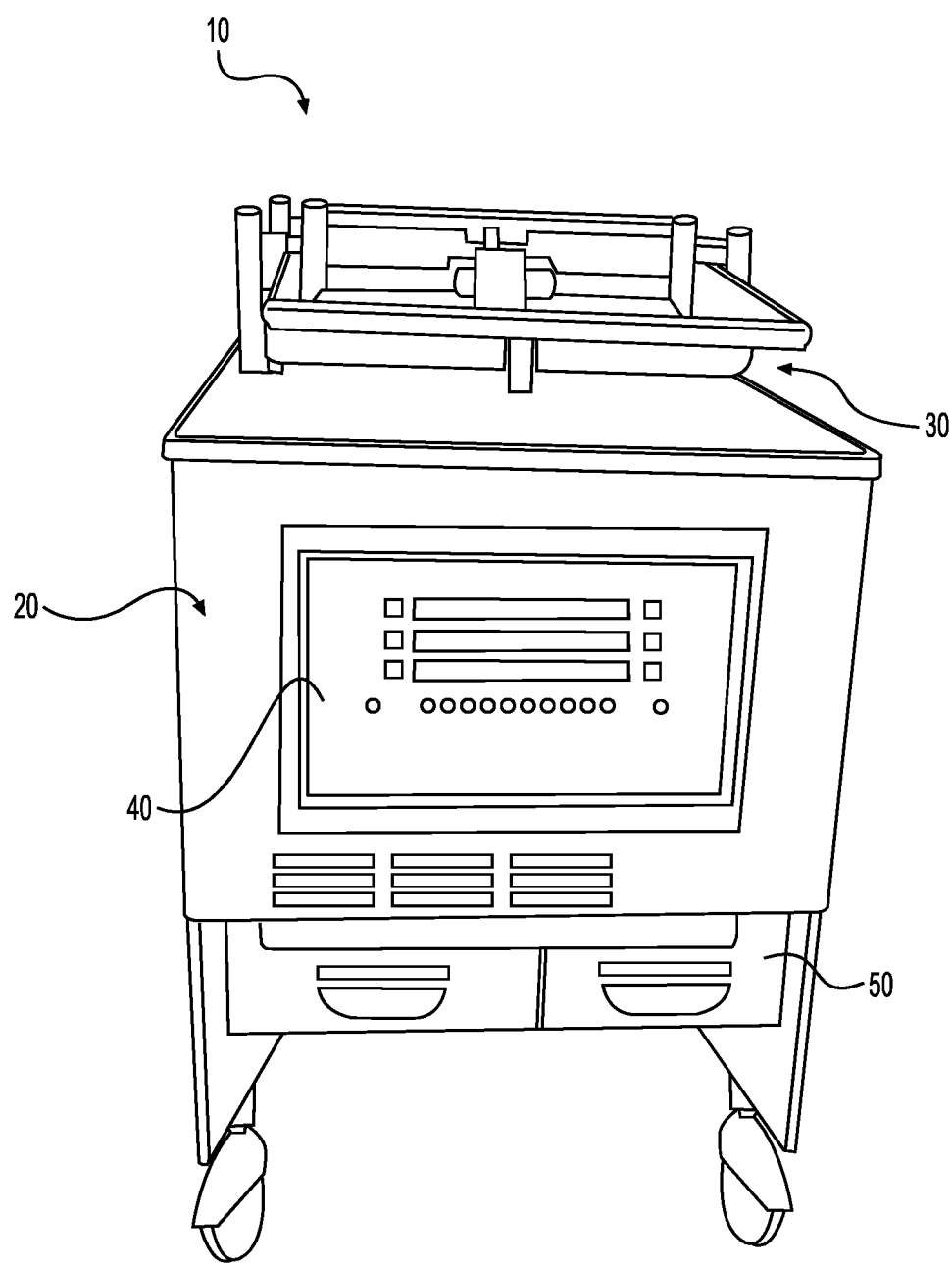
FIG. 1 is a front view of a pressure fryer, according to an embodiment of the invention.
Figure 2:
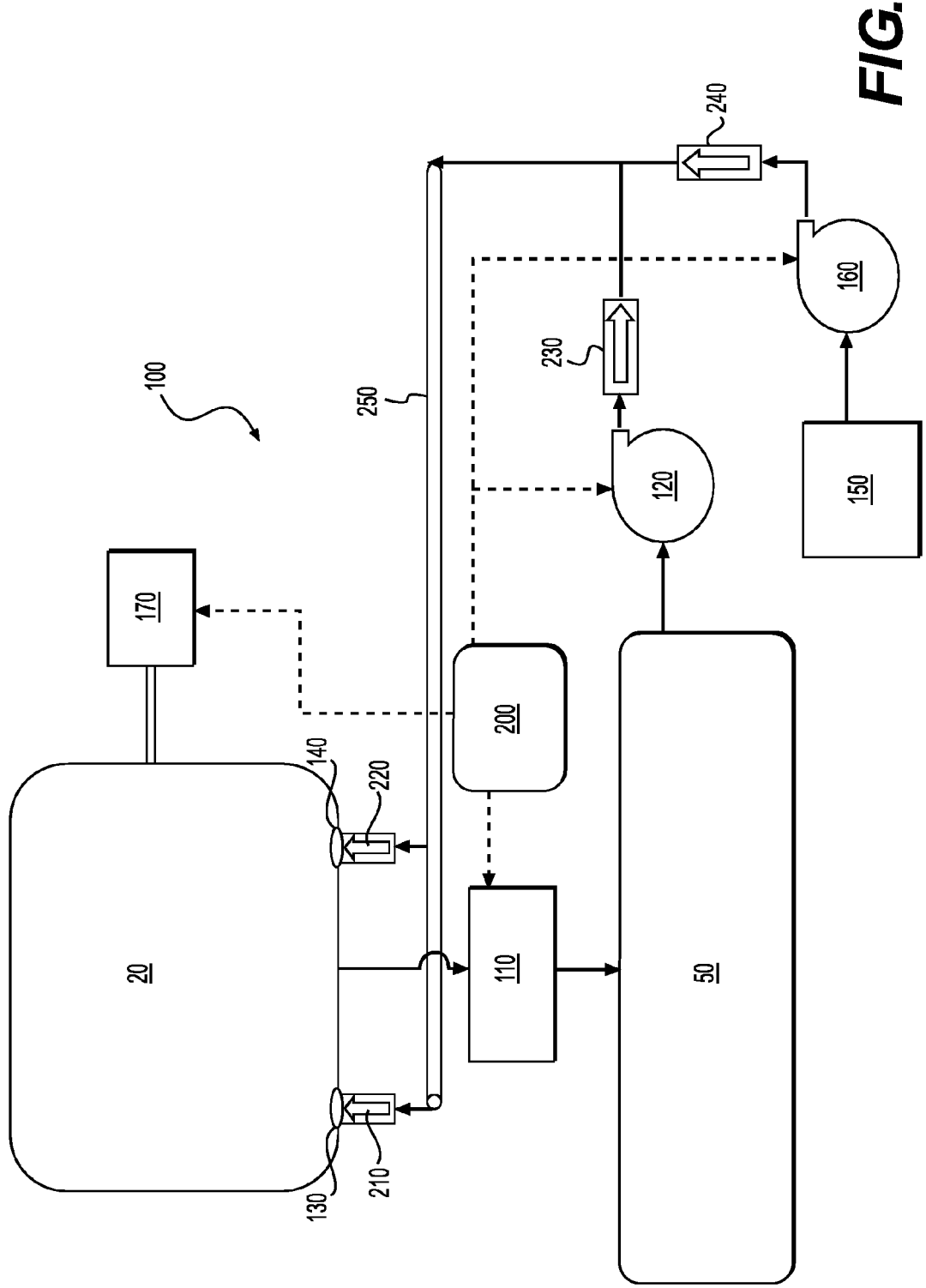
FIG. 2 is a schematic view of the filtration system of the pressure fryer relevant to the pressure assist feature, according to an embodiment of the invention.
Figure 3:
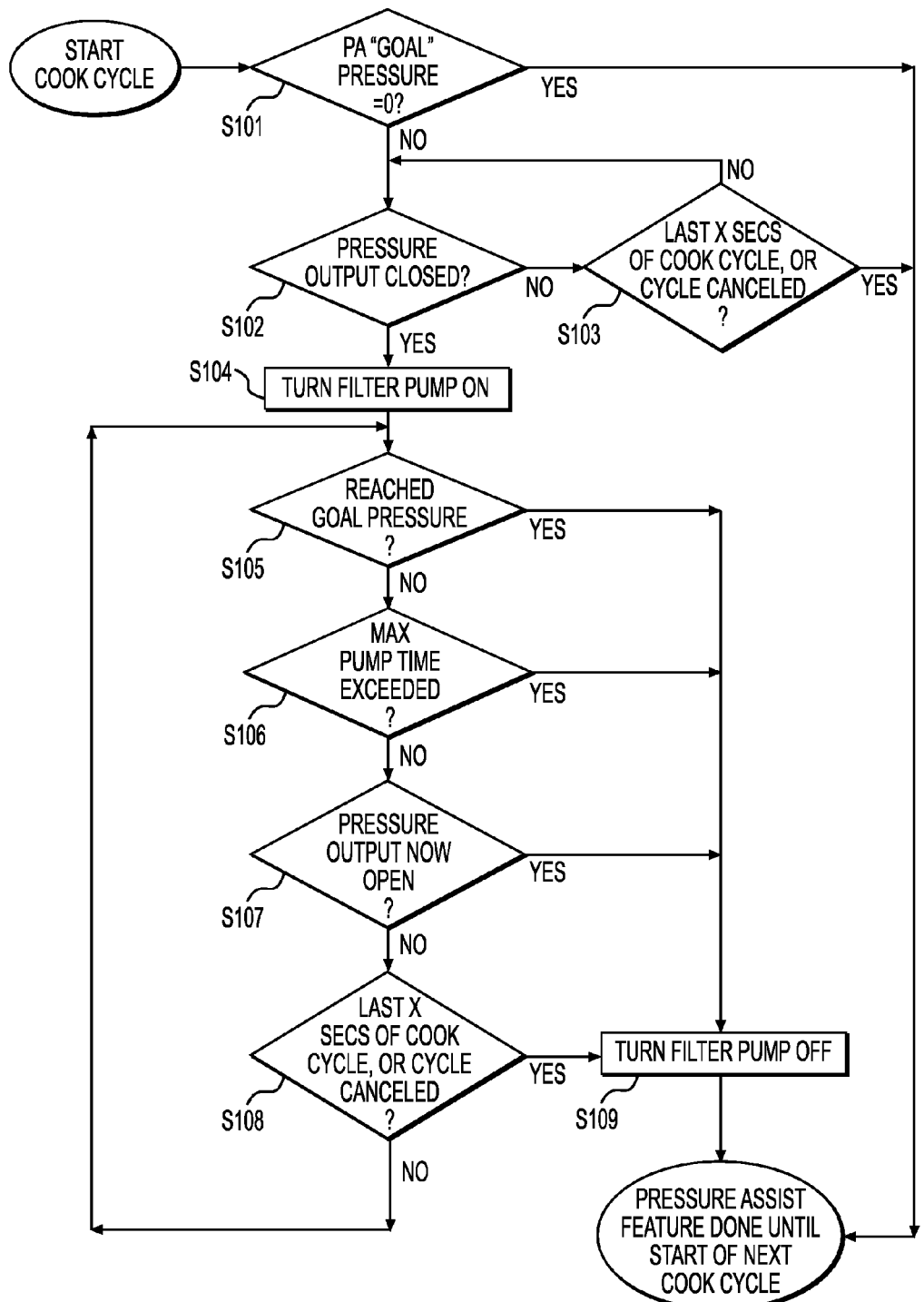
FIG. 3 is a process of implementing the pressure assist feature using components of the filtration system, according to an embodiment of the invention.

Preferred embodiments of the present invention, and their features and advantages, may be understood by referring to FIGS. 1-3, like numerals being used for corresponding parts in the various drawings.

As depicted in FIG. 1, a cooking apparatus 10 may comprise a cooking chamber 20, which may contain at least one heating element (not shown) and may be at least partially filled with a cooking medium. Cooking apparatus 10 may have a lid 30 that may be configured to form a secure airtight seal to seal cooking chamber 20. Cooking apparatus 10 may have a control panel 40, which may receive input of commands from a user to cooking apparatus 10, and which may display information regarding the status of cooking apparatus 10. A fryer controller 200 (FIG. 2) may control the input from and output to control panel 60, and may control the elements of cooking apparatus 10. Cooking apparatus 10 may have a drain pan 50 that may collect the cooking medium that drops from cooking chamber 20, and a filter pump 120 (FIG. 2) may convey the cooking medium from drain pan 50 back into cooking chamber 20.

FIG. 2 depicts a filtration system 100 for cooking apparatus 10. Filtration system 100 may include a drain valve 110 that connects cooking chamber 20 with drain pan 50. Filtration system 100 may include a filter pump 120 that connects drain pan 50 back to cooking chamber 20 via one or more orifices, e.g., orifice 130 and orifice 140. Filtration system 100 may also include an automatic top off ("ATO") reservoir 150 that contains reserve cooking medium, and an ATO pump 160 that connects ATO reservoir 150 with cooking chamber 20 via orifice 130 and orifice 140. Further, filtration system 100 may include check valves 210, 220 located at orifices 130, 140, respectively, of cooking chamber 20; check valve 230 located at the pressure side of filter pump 120; and check valve 240 at the pressure side of ATO pump 160. Check valves 210, 220, 230, and 240 may each be connected to a plumbing manifold 250.

During normal filtration, fryer controller 200 may control drain valve 110 to open, allowing the cooking medium to drop from cooking chamber 20 to drain pan 50. In addition, fryer controller 200 may control filter pump 120 to convey the cooking medium from drain pan 50 back into cooking chamber 20 via orifice 130 and orifice 140. Further, fryer controller 200 may control ATO pump 160 to ensure that cooking chamber 20 has a recommended volume of the cooking medium to ensure proper cooking of the food product. For example, when fryer controller 200 determines that the cooking medium in cooking chamber 20 is below the recommended volume, fryer controller 200 may pump the reserve cooking medium from ATO reservoir 150 to cooking chamber 20. Similarly, fryer controller 200 may be operatively connected to a pressure sensor 170, such as a pressure transducer, that can sense the pressure within cooking chamber 20. In addition, fryer controller 200 may be operatively connected to filter pump 120 such that controller 200 is configured to monitor the time that filter pump 120 is open or closed. Moreover, check valves 210, 220 prevent backflow of the cooking medium from cooking chamber 20 into the plumbing manifold 250; check valve 240 prevents backflow of the cooking medium from cooking chamber 20 into ATO reservoir 150 from filter pump 120; and check valve 230 prevents backflow of cooking medium from ATO reservoir 150 into drain pan 50 from ATO pump 160.

During a normal cooking process in which the pressure assist feature is not implemented, a desired amount of food product is placed into cooking chamber 20, and lid 30 is closed over cooking chamber 20 to form an airtight seal. A user may then input a sequence of time, temperature, and pressure combinations on control panel 40, or alternatively, may input food product information (e.g., weight, type of food product, size of food products, amount of food products, bone-in or bone-out food product, type of breading used, amount of marinade or solution injected into food products, and any other suitable information) so that fryer controller 200 may determine ideal time, temperature, and pressure combination sequences for cooking the food product.

Once the cooking cycle is started, a pressure output (not shown) that connects cooking chamber 20 to outside cooking apparatus 10 may be open to allow for air and steam to vent freely, and may not close until a set time period (typically, a few minutes) into the cooking cycle. In some embodiments, the pressure output may be a pressure solenoid. Once the pressure output is closed, pressure may start to build in cooking chamber 20, and may increase steadily toward an optimal operating pressure, e.g., about 11-12 PSI. Once the optimal operating pressure is reached, a deadweight mechanism (not shown) may regulate the pressure by maintaining the pressure within cooking chamber 20 at the optimal operating pressure. Then, at a predetermined time (typically, a few minutes) prior to the end of the cooking cycle, the pressure output may open to allow pressure to vent out of the cooking apparatus. Once the food product is finished cooking and the pressure inside cooking chamber 20 is safe for lid 30 to be opened and the food product removed, the cooking cycle ends.

The above-discussed cooking process operates at optimal conditions for large loads of food product (e.g., a full, 8-head load of chicken), but may be inefficient for cooking small loads of food product (e.g., a 2-head load of chicken). Specifically, larger loads of food product, which may contain more moisture and more volume, may result in a cooking cycle that reaches operating target pressure faster than a smaller load of food product. In fact, a smaller load of food product may take nearly the entire cooking cycle time to reach operating pressure, which negates many of benefits of using a pressure fryer. In view of this problem, the processes of the pressure assist feature of the preferred embodiments use filter pump 120 during the cooking cycle to more rapidly pressurize cooking chamber 20 and increase the duration of cooking the food product at the optimal operating pressure, particularly when cooking smaller loads of food product.

Referring to FIG. 3, a flowchart of the general operation of the pressure assist feature is provided. After the cooking cycle is started, at S101, fryer controller 200 may determine whether a pre-set optimal pressure, or a desired (i.e., "goal") pressure, is equal to zero (0). If fryer controller determines that the desired pressure is equal to zero, which indicates that the pressure assist feature is not used for the food product, the process may terminate and the pressure assist feature is done until the start of the next cooking cycle. For example, this may include situations in which certain food products may not require prolonged cooking at the optimal pressure, the cooking time may be too short for the pressure assist feature to be effective, or pressure cooking is not desired.

If fryer controller 200 determines that the desired pressure is not equal to zero, in S102, fryer controller 200 may determine whether the pressure output is closed. As discussed above, the pressure output may include a pressure solenoid, and the pressure solenoid may be open initially to allow extra moisture and steam from cooking chamber 20 to vent. If fryer controller 200 determines that the pressure outlet is not closed, in S103, fryer controller 200 may determine whether a predetermined amount of time remains until the end of the cooking cycle (i.e., whether it is the last X seconds of the cooking cycle), or whether the cooking cycle is cancelled. These determinations are important because if fryer controller 200 determines that only a predetermined amount of time remains until the end of the cooking cycle, then the process may terminate because there may not be enough time to implement the pressure assist feature. Similarly, if fryer controller 200 determines that the cooking cycle is cancelled (e.g., due to a system error or user error), then the process may terminate because there is no longer a need for the pressure assist feature. If, on the other hand, the fryer controller 200 determines that it is not the case that a predetermined amount of time remains until the end of the cooking cycle, and that the cooking cycle has not been cancelled, then fryer controller 200 may return to S102 and again determine whether the pressure output is closed. The frequency that fryer controller 200 makes the determinations in S103 may be ten (10) times a second, once a second, or any other suitable frequency.

Alternatively, if fryer controller 200 determines that the pressure output is closed, then in S104, filter pump 120 is turned on to help build pressure in cooking chamber 20. As discussed above, in the filtration cycle, after cooking medium drains from cooking chamber 20 into drain pan 50 via drain valve 110, fryer controller 200 may control filter pump 120 to convey the cooking medium from drain pan 50 back to cooking chamber 20. This cycle may conserve cooking medium while also providing hot, filtered cooking medium ready for immediate use.

For the pressure assist feature, because there is unlikely to be a substantial amount of cooking medium in drain pan 50 at the beginning of the cooking cycle, turning on filter pump 120 may be used to instead convey air from drain pan 50 into cooking chamber 20. At this point, the pressure output may be closed so that steam or air is unable to vent out of cooking chamber 20, filter pump 120 may be turned on to convey air into cooking chamber, and drain valve 110 may remain closed so that no cooking medium is being drained into drain pan 50, causing cooking chamber 20 to pressurize. Control of filter pump 120 for the pressure assist feature may be performed in response to determining the pressure of cooking vessel 20 or running filter pump 120 for a predetermined time to approximate the desired pressure. During this process, fryer controller 200 may continually monitor the pressure within cooking chamber 20 based on the input of pressure sensor 170 or monitor the time for which filter pump 120 is pumping air into cooking vessel 20 for pressurization.

In S105, once the desired pressurization level has been reached (i.e., when the pressure within cooking chamber 20 is equal to or greater than the desired pressure), the pressure assist feature is complete. Thus, in S109, fryer controller 200 may turn filter pump 120 off (i.e., terminate filter pump 120), and the process may terminate. Alternatively, the desired pressure can be approximated based on running filter pump 120, if, for example, pressure sensor 170 is omitted or otherwise not used for the pressure assist feature. Accordingly, the pressure assist feature will be completed after running the filter pump for a predetermined amount of time. The predetermined amount of time for running filter pump 120 to reach the desired pressure may vary based on the cooking load in the vessel, ambient environment, or the type of food product being cooked.

However, in S105, if fryer controller 200 determines that the desired pressurization level has not been reached, then in certain situations, fryer controller 200 may nonetheless turn off (i.e., terminate) filter pump 120. For example, in S106, fryer controller 200 may determine whether cooking chamber 20 failed to build up to the optimal pressure in a reasonable amount of time (i.e., whether the maximum pump time is exceeded), which may indicate a filter pump error. If fryer controller 200 determines that the maximum pump time is exceeded, in S109, fryer controller 200 may turn filter pump 120 off, and the process may terminate. If there are no errors with pump time, then in S107, fryer controller 100 may determine whether the pressure output is open, which may occur when the cooking cycle reaches a point in the cycle when pressure is to be released from cooking chamber 20 (e.g., close to the end of the cooking cycle). If fryer controller 200 determines that the pressure output is open, then in S109, fryer controller 200 may turn filter pump 120 off, and the process may terminate. If there are no issues with the pressure output, then in S108, fryer controller 200 may determine whether a predetermined amount of time remains until the end of the cooking cycle (i.e., determining whether it is the last X seconds of the cooking cycle), at which point it is no longer necessary to use the pressure assist feature.

Fryer controller 200 may also determine whether the cooking cycle has been cancelled, e.g., by the user or by a system error. If fryer controller 200 determines that it is the last X seconds of the cooking cycle, or that the cooking cycle has been cancelled, then in S109, fryer controller 200 may turn filter pump 120 off, and the process may terminate. On the other hand, if fryer controller 200 determines that none of these conditions have occurred, then fryer controller 200 will return to S105 to again determine whether the desired pressure has been reached within cooking chamber 20. The frequency that fryer controller 200 makes the determinations in S105-S108 may be once every second, once every minute, or any other suitable frequency.

The advantages of the preferred embodiments include: more rapid pressurization of cooking chamber 20, especially when cooking smaller loads of food product; maximization of the duration of cooking the food product under the optimal pressure; the ability to fine-tune the pressurization of cooking chamber 20 to different levels and for different kinds and amounts of food products; and controlling filter pump 120 to supply pressure to cooking chamber 20, resulting in the ability to utilize the features in a pressure fryer to the fullest extent.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A method for rapidly increasing pressure in a cooking vessel of a pressure fryer during a cooking cycle, the pressure fryer also including a controller having at least one processor and a memory, the method comprising:

starting the cooking cycle of a food product by closing a lid of the pressure fryer and activating, automatically by the controller, heating elements to heat up a cooking medium and the food product in the cooking vessel, the cooking cycle therefore being a pressure cooking cycle;

determining, automatically by the controller, whether a pressure output in the cooking vessel is open or closed, the pressure output configured to vent at least one of air and steam out of the cooking vessel when the cooking vessel is closed to the outside environment with the lid;

determining, automatically by the controller, a pressure of the cooking vessel;

comparing, automatically by the controller, the pressure of the cooking vessel to a predetermined optimal pressure to determine whether the pressure of the cooking vessel is less than the optimal pressure;

in response to determining that both the pressure output is closed and the pressure of the cooking vessel is less than the optimal pressure, activating, automatically by the controller, a filter pump configured to supply air from a drain pan into the cooking vessel to help build pressure in the cooking vessel;

deactivating, automatically by the controller, the filter pump when the pressure within the cooking vessel is equal to or greater than the optimal pressure;

activating a top off pump configured to supply cooking medium from a reservoir into the cooking vessel in response to determining that a volume of the cooking medium in the cooking vessel is less than an optimal volume;

determining, automatically by the controller, whether a maximum pump time for the filter pump is exceeded after activating the filter pump and when the pressure within the cooking vessel is less than the optimal pressure; and deactivating, automatically by the controller, the filter pump in response to determining that the maximum pump time is exceeded.

2. The method according to claim 1, wherein prior to activating the filter pump:

the filter pump is not activated, automatically by the controller, in response to a comparison that the pressure of the cooking vessel is equal to or greater than the optimal pressure, and the filter pump is activated, automatically by the controller, in response to a comparison that the pressure of the cooking vessel is less than the optimal pressure.

3. The method according to claim 1, further comprising:

in response to determining that the pressure output is open, determining, automatically by the controller, whether a predetermined amount of time remains until an end of the cooking cycle or whether the cooking cycle is cancelled, and performing, automatically by the controller, one of the following actions based on determining whether the predetermined amount of time remains until the end of the cooking cycle or whether the cooking cycle is cancelled:

in response to determining that the predetermined amount of time remains until the end of the cooking cycle or that the cooking cycle is cancelled, not activating the filter pump during the cooking cycle, and in response to determining that the predetermined amount of time does not remain until the end of the cooking cycle and that the cooking cycle is not cancelled, checking again to determine whether the pressure output in the cooking vessel is open or closed.

4. The method according to claim 1, further comprising:

determining, automatically by the controller, whether the pressure output is open after activating the filter pump, and deactivating, automatically by the controller, the filter pump in response to determining that the pressure output is open.

5. The method according to claim 1, further comprising:

determining, automatically by the controller, whether a predetermined amount of time remains until an end of the cooking cycle after activating the filter pump, and deactivating, automatically by the controller, the filter pump in response to determining that the predetermined amount of time remains until the end of the cooking cycle.

6. The method according to claim 1, further comprising:

determining, automatically by the controller, whether the cooking cycle is cancelled after activating the filter pump, and deactivating, automatically by the controller, the filter pump in response to determining that the cooking cycle is cancelled.

7. The method according to claim 1, further comprising:

determining whether a drain valve in the cooking vessel is closed after determining that the pressure output is closed and prior to activating the filter pump, the drain valve configured to drain cooking medium from the cooking vessel into the drain pan when open; and activating, automatically by the controller, the filter pump after determining that the drain valve is closed.

8. The method according to claim 1, wherein the pressure output comprises a pressure solenoid.

9. A method for rapidly increasing pressure in a cooking vessel of a pressure fryer during a cooking cycle, the pressure fryer also including a controller having at least one processor and a memory, the method comprising:

starting the cooking cycle of a food product by closing a lid of the pressure fryer and activating, automatically by the controller, heating elements to heat up a cooking medium and the food product in the cooking vessel, the cooking cycle therefore being a pressure cooking cycle;

determining, automatically by the controller, whether a pressure output in the cooking vessel is open or closed, the pressure output configured to vent at least one of air and steam out of the cooking vessel when the cooking vessel is closed to the outside environment with the lid;

determining, automatically by the controller, a pressure of the cooking vessel;

comparing, automatically by the controller, the pressure of the cooking vessel to a predetermined optimal pressure to determine whether the pressure of the cooking vessel is less than the optimal pressure;

in response to determining that both the pressure output is closed and the pressure of the cooking vessel is less than the optimal pressure, activating, automatically by the controller, a filter pump configured to supply air from a drain pan into the cooking vessel to help build pressure in the cooking vessel;

deactivating, automatically by the controller, the filter pump when the pressure within the cooking vessel is equal to or greater than the optimal pressure;

determining, automatically by the controller, whether a maximum pump time for the filter pump is exceeded after activating the filter pump and when the pressure within the cooking vessel is less than the optimal pressure;

deactivating, automatically by the controller, the filter pump in response to determining that the maximum pump time is exceeded;

wherein prior to activating the filter pump:

the filter pump is not activated, automatically by the controller, in response to a comparison that the pressure of the cooking vessel is equal to or greater than the optimal pressure, and the filter pump is activated, automatically by the controller, in response to a comparison that the pressure of the cooking vessel is less than the optimal pressure;

in response to determining that the pressure output is open, determining, automatically by the controller, whether a predetermined amount of time remains until an end of the cooking cycle or whether the cooking cycle is cancelled;

performing, automatically by the controller, one of the following actions based on determining whether the predetermined amount of time remains until the end of the cooking cycle or whether the cooking cycle is cancelled:
  in response to determining that the predetermined amount of time remains until the end of the cooking cycle or that the cooking cycle is cancelled, not activating the filter pump during the cooking cycle, and
  in response to determining that the predetermined amount of time does not remain until the end of the cooking cycle and that the cooking cycle is not cancelled, checking again to determine whether the pressure output in the cooking vessel is open or closed;
determining, automatically by the controller, whether the pressure output is open after activating the filter pump;
deactivating, automatically by the controller, the filter pump in response to determining that the pressure output is open;
determining, automatically by the controller, whether a predetermined amount of time remains until an end of the cooking cycle after activating the filter pump;
deactivating, automatically by the controller, the filter pump in response to determining that the predetermined amount of time remains until the end of the cooking cycle;
determining, automatically by the controller, whether the cooking cycle is cancelled after activating the filter pump; and
deactivating, automatically by the controller, the filter pump in response to determining that the cooking cycle is cancelled.

* * * * *